Figure 1:
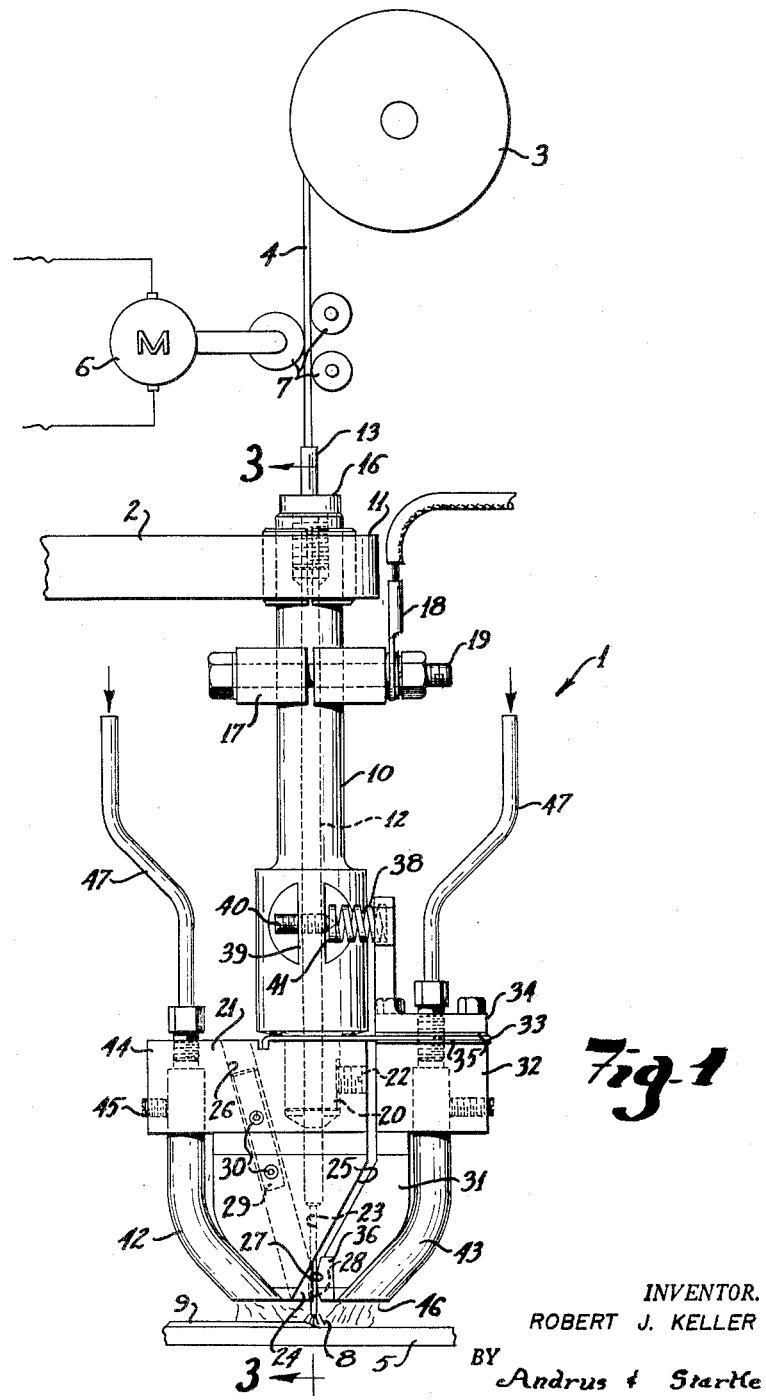

March 9, 1965

R. J. KELLER 3,172,992

AIR COOLED ARC WELDING NOZZLE ASSEMBLY

Filed April 5, 1962

2 Sheets-Sheet 1

INVENTOR.
ROBERT J. KELLER
BY Andrus & Starke
Attorneys

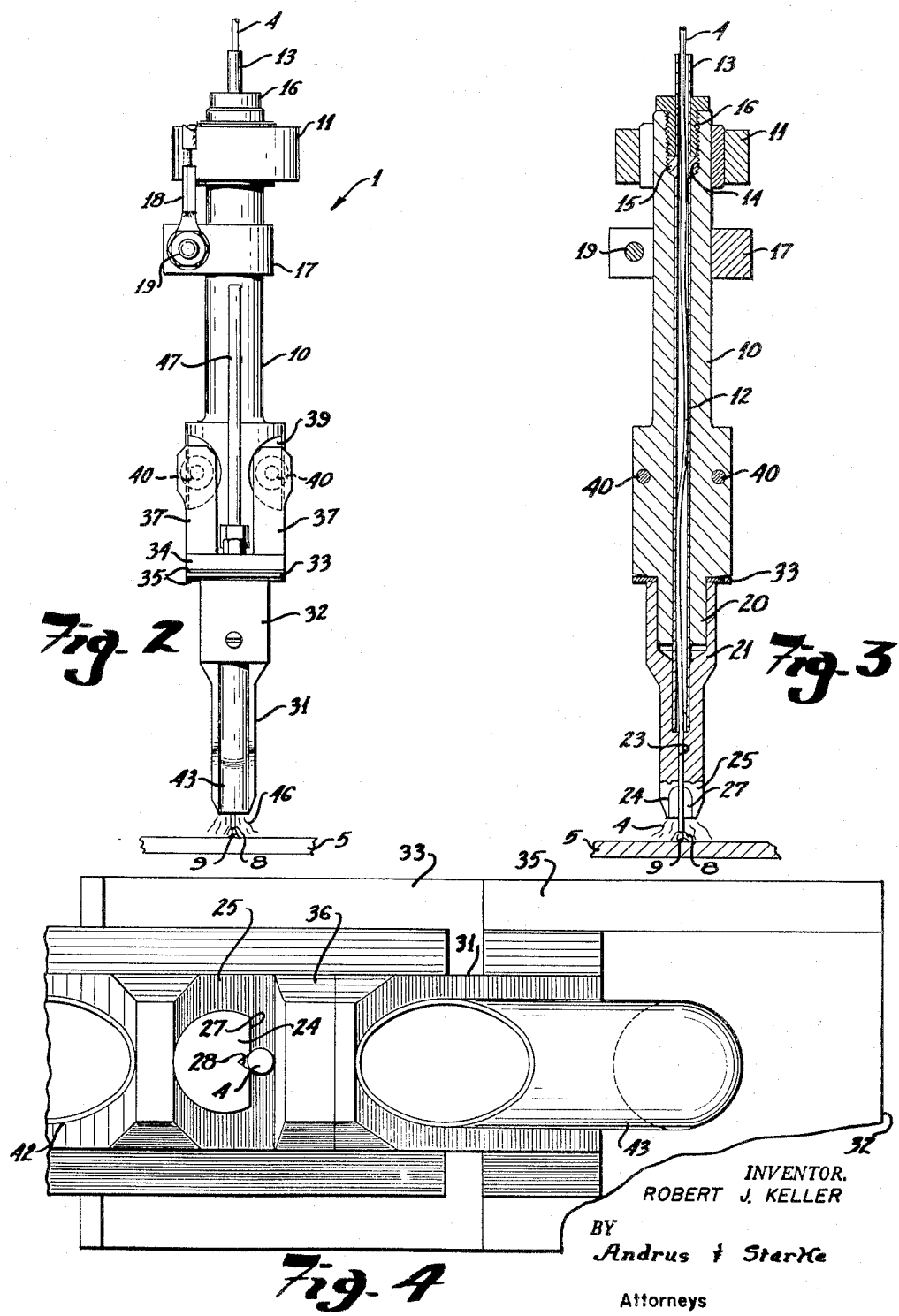

United States Patent Office 3,172,992
Patented Mar. 9, 1965

3,172,992
AIR COOLED ARC WELDING NOZZLE ASSEMBLY
Robert J. Keller, Milwaukee, Wis., assignor to A. O. Smith Corporation, Milwaukee, Wis., a corporation of New York
Filed Apr. 5, 1962, Ser. No. 185,418
4 Claims. (Cl. 219—130)

This invention relates to an arc welding nozzle assembly and particularly to an air cooled nozzle assembly having jaw-type contact means for frictionally engaging a consumable welding electrode.

In a consumable electrode welding process, a welding rod of indefinite length is continuously fed and consumed by an arc established between the tip of the electrode and the workpiece. A nozzle assembly is employed to direct and properly locate the tip of the electrode with respect to the workpiece for locating the weld. Generally, a water cooling system has been provided to carry away the great heat generated by the current flowing through the nozzle assembly and the heat picked up by conduction from the arc proper.

The water cooling systems require introduction of water channels or the like within the nozzle assembly and substantially increase the cost and complexity of the assembly. Various proposals have recently been made for air cooled nozzle assemblies.

In a consumable welding process, the current is preferably supplied to the consumable electrode immediately adjacent the tip of the electrode in order to establish a uniform heating of the electrode and similar burn off rate at the arc.

The current is generally transferred to the electrode through a sliding contact within the nozzle assembly. It becomes extremely important to maintain the continuous engagement between the current transfer point and the electrode in order to avoid the possible danger of arcing between the contact and the electrode. Such arcing if allowed to occur creates a pit or projection in the contact member which provides a focal point for establishing successively increasing arcs until the member is effectively operatively destroyed and must be replaced. Resilient jaw-type contact units have been suggested to maintain a firm and selected position of current transfer to the electrode.

The present invention is particularly directed to a welding nozzle having improved jaw-type contacts particularly adapting the unit for consumable arc welding processes. The nozzle assembly may be air cooled. The nozzle assembly of the present invention is readily and easily serviced and maintained by the welding operator.

Generally, in accordance with the present invention, a relatively large solid nozzle head body is secured to a supporting mounting stem or the like with an electrode passage in the respective components for directing an electrode to a workpiece.

An adjustable contact member is vertically and angularly mounted in the nozzle head body for selective positioning adjacent the discharge end of the electrode passageway in the nozzle head body. The adjustable contact member includes a contact surface which is maintained axially aligned with the path of the electrode passageway. A nozzle shoe is secured to a laterally extending leaf spring with the lower end thereof diametrically opposed to the contact surface of the adjustable contact member. The upper end of the shoe is resiliently biased to pivot the shoe about the leaf spring and force the shoe toward the contact member to resiliently grasp the moving electrode therebetween. The current is preferably introduced into the nozzle assembly adjacent the mounting stem and flows down through the stem and the nozzle head body to the contact member. The current is transferred to the electrode at the contact surface of the adjustable contact member.

A further very important concept of the present invention for gas shielded arc welding is the provision of two or more gas tubes or passageways secured to the leading and trailing portions of the nozzle assembly. The gas tubes terminate generally in the lower plane of the nozzle head assembly and discharge a shielding gas envelope over an arc established between the tip of the electrode and the workpiece.

The nozzle head body is a solid member adapted to rapidly dissipate the heat to the surrounding atmosphere and the necessity for water cooling of the nozzle assembly has been eliminated for most arc welding processes employing the nozzle.

The present invention provides a new and improved arc welding nozzle which may be air cooled and which includes an improved current transfer to a consumable electrode.

The drawings furnished herewith illustrate the best mode presently contemplated for carrying out the invention.

In the drawings:

FIG. 1 is a side elevational view of the nozzle assembly;
FIG. 2 is a front elevational view of the nozzle shown in FIG. 1;
FIG. 3 is a vertical section taken on line 3—3 of FIG. 1; and
FIG. 4 is an enlarged bottom view of the nozzle assembly.

Referring to the drawings and particularly to FIGS. 1 and 2, an arc welding head unit is illustrated including a lower arc welding nozzle assembly 1 releasably secured to a supporting unit 2. An electrode reel 3 is suitably mounted above the assembly 1 and carries an electrode 4 which is fed down through the nozzle assembly into proper alignment with a workpiece 5. A drive motor 6 is mounted between the reel 3 and the nozzle assembly 1 and is suitably coupled, as diagrammatically shown, to actuate feed rolls 7 which frictionally grip the electrode 4 and continuously feed it through the nozzle assembly 1. An arc 8 is struck between the tip of the electrode 4 and the workpiece and consumes the electrode 4 to form a desired weld 9 on the workpiece 5.

Generally, the illustrated nozzle assembly 1 includes a tubular supporting stem 10 which is releasably secured to the support unit 2 by a conventional split clamp 11. A longitudinal aperture or opening is provided centrally of the tubular stem 10 defining an electrode passageway. A tubular insulator 12 is secured within the tubular passageway by an electrode guide 13 which is secured within a threaded opening 14 at the top of the stem 10. The guide 13 includes boss 15 resting in the base of opening 14 and forming a clamping shoulder. A suitable lock nut 16 is threaded into the enlarged opening 14 and bears on the boss 15 to clamp the inlet guide 13 and the insulator 12 in position with the guide 13 and insulator 12 coaxially aligned.

A contact terminal clamp 17 is secured to or formed integrally with an upper portion of the stem and an electrical terminal 18 is connected securely thereto as by a usual nut and bolt assembly 19. The current from terminal 18 passes through the stem 10 but is not transferred to the electrode 4 at the stem due to the action of the tubular insulator 12.

The mounting stem 10 includes a lower reduced projection 20 which mates with a corresponding recess in the upper end of a nozzle head body 21.

The nozzle head body 21 is generally a solid rectangular metal block which is preferably chrome plated. The principal plane of the body 21 in the vertical plane of the weld 9. A recess for receiving the lower end or projection 20 of the stem 10 is provided in the upper end of the nozzle head body 21 and a small set screw 22 threads through a suitable tapped opening in the edge of the body 21 into bearing and clamping engagement with projection 20. The projection 20 is thereby secured in firm engagement with the adjacent wall of body 21 to support stem 10 and to establish a current transfer area.

An electrode passageway 23 is provided in the body 21 in alignment with the passage in the stem 10. The upper portion of the passageway 23 is enlarged to accommodate the lower end of the insulator 12 which projects outwardly of the stem projection 20. This reduces the area of direct conductive contact of the electrode 4 to the stem 10 and body 21 to the small portion immediately below the insulator 12. As a result, the current from cable 18 is directed through stem 10 and body 21 to a low resistance path at an insert or contact member 24, as hereinafter more fully described.

The lower right portion in FIG. 1 of the head body 21 has a cut away corner 25 beginning in the lower plane or body 21 and extending angularly upwardly from the lower end of an opening 26 for the contact member 24. The opening for the member 24 extends upwardly at an angle to the opposite side of the body 21 from cut-away corner 25 and slidably receives the contact member 24. The lower end of opening 26 lies in the slanting wall of cut-away corner 25 immediately adjacent the passageway 23. The contact member 24 includes a contact surface 27 formed by removing a wedge-shaped portion from the lower end thereof with the wedge angle corresponding to the angle between the axis of the opening 26 and the passageway 23 to align the contact surface 27 with the axis of the passageway 23.

A small V-shaped groove 28 is formed in the contact surface 27 in alignment with the electrode 4 to provide a positive guide and positioning means and to accommodate various diameter electrodes. The edges of groove 28 establish a positive and optimum sliding contact or engagement between the moving electrode 4 and the contact member 24.

The upper end of the contact member 24 includes a flat locating surface 29 aligned with a pair of set screws 30 which are threaded through suitable openings in the wall of the nozzle head body 21. The set screws 30 bear against the flattened surface 29 and hold the contact member 24 with the contact surface 27, and more particularly the groove 28, aligned with the axis of electrode 4 and immediately adjacent the path thereof. The continued sliding movement of the electrode 4 over surface 27 may wear the contact surface and destroy the proper alignment of the electrode 4 with the axis of the passageway 23. In the illustrated embodiment of the invention, the contact member 24 may be dropped downwardly to maintain the proper axial positioning of the electrode.

A contact shoe 31 extends angularly adjacent the cut-out corner 25 of the head body 21 and terminates in an attachment block 32 adjacent the upper portion of the head body 21. One end of a flat leaf spring 33 is clamped between the upper surface of the attachment block 32 and a clamp plate 34 by socket cap bolts or the like. Insulating sheets 35 are provided on opposite sides of the spring 33 to electrically insulate the spring 33 from shoe 31.

The leaf spring 33 projects from the attachment block 32 and is tightly clamped between the base of the stem 10 and the upper surface of the nozzle head body 21 and supports the shoe 31 in slightly spaced relation to body 21. The leaf spring 33 provides a convenient means for mounting the contact shoe 31 while allowing restrictive angular movement of the lower end of the shoe 31.

A contact shoe insert 36 is secured to the lowermost end of the shoe 31 in diametrically opposed relation to the groove 28 in contact surface 27 and is adapted to resiliently force the electrode 4 into firm electrical sliding contact with the contact surface 27 of insert 24.

A lever 37 projects axially upwardly and integrally from the bracket 34 immediately adjacent the stem 10. A pair of pressure springs 38 are disposed on opposite sides of the stem 10 and are compressed between the lever 37 and laterally projecting ears 39 provided on the stem 10. Adjustment screws 40 thread through suitable openings in the ears 39 and bear on spring guides 41 which are secured to the ends of the pressure springs 38. The adjustment screws 40 allow selective compression of the pressure springs 38 and adjustment of the contact pressure as applied through the contact shoe 31.

The illustrated nozzle assembly 1 is adapted for gas shielded arc welding and includes suitable gas tubes 42 and 43 releasably secured to the nozzle head body 21 and the nozzle head shoe 31, respectively.

The gas tube 42 is mounted within a vertical opening provided in an extension 44 of the upper portion of the head body 21 by a small set screw 45 which threads through a suitable opening in the side edge of the extension 44. The gas tube 42 extends downwardly and then inwardly toward the electrode 4 terminating with the lower end thereof generally in the horizontal plane of the bottom plane of body 21 and shoe 31. The tube 42 directs a shielding gas 46 to the arc 8 to prevent contamination of the molten weld metal.

The gas tube 43 is similarly secured to the underside of the attachment block 32 of shoe 31 and extends downwardly and inwardly along the side of the shoe and terminates immediately adjacent the lower end of the shoe 31 to direct shielding gas toward the arc 8.

Similar suitable gas fittings 47 are respectively secured to the upper end of vertical openings provided in the nozzle body 21 and the shoe 31. The fittings 47 are connected to any suitable source of a shielding gas, not shown.

The operation of the illustrated embodiment of the invention is generally summarized as follows.

The nozzle assembly 1 and other components of the welding head are secured to the support unit 2 and located with respect to workpiece 5 with the principal plane of the nozzle body 21 and the shoe 31 aligned with the line of the weld 9. The electrode 4 is fed down through the nozzle assembly 1 with the contact insert 24 properly located to maintain the axis of the electrode in alignment with the passageway 23 and establish firm sliding engagement between the electrode 4 and the edge of groove 28 in contact surface 27 and the shoe insert 36 of shoe 31. The tension screws 40 are preset to provide the desired contact pressure exerted by the shoe 31.

Current is supplied through the contact terminal clamp 17 and flows downwardly through the stem 10 and the nozzle head body 21 to the insert 24. The current passes from the insert 24 to the electrode 4 at the contact surface 27. The insulating sheets 35 positively prevent current flow through the spring 33 and shoe 31 to the electrode 4. The pressure clamping of the electrode 4 to the edges of groove 28 provides an area of minimum resistance and essentially all of the current transfer is maintained at the contact surface 27.

The current flows downwardly through electrode 4 and establishes and maintains the arc 8.

The shielding gas 46 flows downwardly through the gas tubes 42 and 43 and is directed outwardly over the arc 8 to envelope the arc in a protective gas.

Various modes of carrying out the invention are contemplated as being within the scope of the following claims particularly pointing out and distinctly claiming the subject matter which is regarded as the invention.

I claim:
1. A welding nozzle assembly comprising,
   (a) a conducting mounting stem having an insulated axial electrode passageway and a welding current power terminal,
   (b) a nozzle body of conductive material secured to the lower end of the mounting stem and having an electrode passageway aligned with the electrode passageway in said mounting stem, (c) a contact insert mounted within an insert passageway extending angularly outwardly and upwardly in the nozzle body from the lowermost end of the electrode passageway in the nozzle body, said insert having a contact surface extending parallel to the electrode passageway for slidable engagement with the electrode and serving to locate the discharge end of the electrode, (d) a contact shoe having a lower end in opposed electrode grasping position to said contact surface of said insert, (e) a leaf spring secured between the mounting stem and the nozzle body and to the contact shoe to support the contact shoe for limited pivotal movement, (f) a biasing lever secured to the contact shoe and extending vertically upwardly in spaced parallel relation to the stem, (g) spring means mounted between the lever and the stem, and (h) pressure adjusting means coupled to the spring means to adjust the pressure thereof on the biasing lever to control the gripping force between the contact insert and the contact shoe.

2. A welding nozzle assembly for directing an electrode to an arc comprising, (a) a conducting mounting stem having an axial electrode passageway and a welding current power terminal, (b) a tubular insulator secured in the passageway and extending downwardly therefrom, (c) a rectangular nozzle body of conductive material having a recess adjacent one end with the lower end of the mounting stem secured therein, said nozzle body including an electrode passageway having a portion adjacent the recess enlarged to receive the said tubular insulator and having a slanting wall extending across the passageway, (d) a contact insert adjustably mounted within an insert passageway extending angularly outwardly and upwardly within the nozzle body from the lowermost end of the slanting wall immediately adjacent the discharge end of the electrode passageway, said insert having a contact surface at the lower end for slidably engaging the electrode and serving to locate the lower end of the electrode, (e) a contact shoe disposed adjacent the nozzle body and having a portion thereof opposed to the contact surface of said insert, (f) a leaf spring secured to the nozzle body and the contact shoe, (g) a biasing lever secured to the contact shoe, and (h) adjustable resilient means acting between said lever and a portion of the stem to adjustably resiliently urge the contact shoe toward said insert.

3. A welding nozzle assembly for directing a consumable electrode to an arc comprising, (a) a conducting mounting stem having an axial electrode passageway and a welding current power terminal, (b) a tubular insulator secured in the passageway and extending downwardly therefrom, (c) a rectangular nozzle body of conductive material having an opening adjacent one end mating with the lower end of the mounting stem, said nozzle body including an electrode passageway having a portion adjacent the recess enlarged to receive the lower end of said tubular insulator and having a lower slanting wall extending across the discharge end of the passageway, (d) a set screw threadedly secured within the nozzle body and bearing upon the lower end of the stem to establish a firm engagement between the stem and the nozzle body for current transfer from the stem to the nozzle body, (e) a cylindrical contact insert mounted within an insert passageway in the nozzle body, said insert passageway extending angularly outwardly and upwardly from the lowermost end of the slanting wall immediately adjacent the end of the electrode passageway, said insert having a contact surface at the lower end with an electrode receiving groove extending parallel to the electrode passageway for slidable engagement with the electrode and serving to maintain the discharge end of the electrode in essential alignment with the electrode passageway, (f) set screw means releasably securing the contact insert in place, (g) a contact shoe extending generally parallel to the slanting wall and terminating in a mounting head, (h) a leaf spring clamped between said mounting stem and the nozzle body and projecting outwardly over the upper surface of the contact shoe, (i) a bracket secured to the top of the shoe and clamping the leaf spring to the shoe, (j) a biasing lever secured to the bracket and extending in spaced parallel relation to the stem, (k) a pair of coil springs mounted on opposite sides of the stem and held between the lever and ears provided on the stem, (l) spring guides mounted on each of the coil springs adjacent the stem, and (m) pressure adjusting screws threadedly secured within the ears and bearing on the spring guides.

4. In a welding nozzle assembly for directing an electrode to a workpiece to be welded, (a) a metallic body portion having an axial electrode passageway, (b) a power source terminal connected to the body portion, (c) a contact member slidably mounted in the body portion diagonally outwardly of the electrode passage and upwardly of the metallic body and having an elongated inner contact surface disposed parallel to the electrode at the discharge end of the electrode passageway adjacent the workpiece to be welded, (d) a contact shoe, (e) a leaf spring secured to the body portion and to the contact shoe and holding the shoe in opposed relation to the contact surface, and (f) coil spring means coupled to the contact shoe and metallic body portion and in combination with said leaf spring resiliently urging the contact shoe toward the contact surface of the contact member for firmly gripping the electrode therebetween.

References Cited by the Examiner
UNITED STATES PATENTS

| | | | |
|---|---|---|---|
| 2,179,108 | 11/39 | Westberg | 219—130 |
| 2,289,938 | 7/42 | Smith | 219—136 |
| 2,347,646 | 5/44 | Smith | 219—136 |

RICHARD WOOD, *Primary Examiner.*